United States Patent
Wolf et al.

(10) Patent No.: US 7,323,046 B1
(45) Date of Patent: Jan. 29, 2008

(54) PHTHALOCYANINE PIGMENTS WITH NEUTRAL METALLIC DOWN FLOP

(75) Inventors: Bethany J. Wolf, Mt. Pleasant, SC (US); Brian Thompson, Goose Creek, SC (US); Wengan Wu, Mt. Pleasant, SC (US); Richard K. Faubion, Mt. Pleasant, SC (US)

(73) Assignee: Sun Chemical Corporation, NJ (US)

( * ) Notice: Subject to any disclaimer, the term of this patent is extended or adjusted under 35 U.S.C. 154(b) by 0 days.

(21) Appl. No.: 11/463,545

(22) Filed: Aug. 9, 2006

(51) Int. Cl.
*C09B 67/12* (2006.01)
*C09B 67/02* (2006.01)
*C09B 67/20* (2006.01)
*C09B 67/50* (2006.01)
*C09B 47/04* (2006.01)
*C09D 11/00* (2006.01)

(52) U.S. Cl. ............... 106/413; 106/31.73; 106/31.78; 106/410; 106/411; 106/412; 523/160; 523/161; 524/88

(58) Field of Classification Search ............. 106/31.73, 106/31.78, 410, 411, 412, 413; 523/160, 523/161; 524/88
See application file for complete search history.

(56) References Cited

U.S. PATENT DOCUMENTS

| 5,284,511 A | * | 2/1994 | Rolf et al. ................... 106/410 |
| 5,725,649 A | | 3/1998 | Marr |
| 5,728,204 A | | 3/1998 | Sattar et al. |
| 6,726,755 B2 | * | 4/2004 | Titterington et al. ..... 106/31.29 |

FOREIGN PATENT DOCUMENTS

| JP | 4-220470 A | * | 8/1992 |
| JP | 7-70497 A | * | 3/1995 |
| JP | 9-296138 A | * | 11/1997 |

* cited by examiner

Primary Examiner—Anthony J. Green
(74) Attorney, Agent, or Firm—Dickstein, Shapiro, LLP.

(57) ABSTRACT

Phthalocyanine pigments having 0-4 chlorine atoms have a narrow particle-size range with 90% of particles between about 0.01-0.10 μm, the average particle size of no more than about 0.5 μm, a D99 of no more than about 0.3 μm, and a polydispersity of about 2.0 or less. Pigment compositions contain the phthalocyanine pigment and water-based dispersing resin. The pigments and the compositions are compatible with waterborne coating systems, exhibit an excellent metallic down travel, and are especially useful for the automotive painting applications.

38 Claims, 2 Drawing Sheets

PHTHALOCYANINE PIGMENTS WITH NEUTRAL METALLIC DOWN FLOP

FIELD OF THE INVENTION

The present invention relates to phthalocyanine pigments, in particular, copper phthalocyanine pigments and compositions thereof that are prepared without requiring the use of sulfonated or anionic phthalocyanine complexes and yet exhibit an excellent metallic down travel. The pigments and the compositions are compatible with waterborne coating systems and especially useful for automotive painting applications.

BACKGROUND OF THE INVENTION

Due to rising environmental restraints placed on the entire chemical industry, there has long been a need to develop more environmentally friendly processes involving less solvent. The automotive industry therefore has been moving more towards the use of waterborne systems for their paint applications. Thus, the goal of many high performance pigment manufacturers is to provide waterborne paints with attributes comparable to their solventborne counterparts.

Chlorinated copper phthalocyanine pigments have been a considerable problem in this area as their attributes in waterborne systems have always been less desirable than their solventborne equivalents. U.S. Pat. No. 5,725,649 discloses chlorinated copper phthalocyanine containing 0-4 chlorine atoms having a crystal size in the range of from 0.01 to 0.2 μm and an ionic complex formed from copper phthalocyanine sulphonic acid and a quaternary amine. This product is produced by either acid pasting or salt ball milling followed by a solvent treatment and exhibits a green down flop in metallic paints. U.S. Pat. No. 5,728,204 discloses a water-dispersible phthalocyanine pigment in combination with a sulfonated copper phthalocyanine, having a mean particle size of about 0.2 to about 0.3 μm and exhibiting a neutral metallic down flop. In this case, the copper phthalocyanine pigment is processed by ball milling without salt followed by optional solvent treatment.

It is noteworthy that both of these prior patents require the use of copper phthalocyanine derivatives, such as sulfonated, anionic phthalocyanine complexes, to obtain the desired effect. Such copper phthalocyanine derivatives have been implicated in paint film problems, such as poor humidity resistance and occurrences of delamination.

Thus, a waterborne system for automotive painting applications without requiring the presence of such ionic additives is desired, in particular, for a waterborne blue exhibiting shade, strength and metallic down travel similar to the current solventborne products.

SUMMARY OF THE INVENTION

The present invention provides phthalocyanine pigments and compositions thereof that are suitable for waterborne coating systems, particularly useful for automotive painting applications. In particular, the present invention provides phthalocyanine pigments having a narrow particle-size distribution, as reflected by a specific polydispersity value defined below, which achieve the desired substantially neutral down travel in metallic paint films. The terms "travel", "down travel" and "down flop" used interchangeably herein all refer to a change in apparent color value of a metallic paint film when measured from a 15° to 110° viewing angle. The term "travel delta hue (Travel dH)" used herein refers to a difference in hue between the 15° measurement and the 110° measurement. When there is no difference between the two measurements (i.e., Travel dH=0), the down travel is said to be "neutral." The smaller the travel dH, the better the appearance of the paint.

In a preferred embodiment, phthalocyanine pigments of the present invention are metallophthalocyanine pigments and the metal of the metallophthalocyanine is most preferably copper. Thus, the present invention provides copper phthalocyanine pigments that have excellent dispersibility in waterborne systems and exhibit an attractive substantially neutral down travel. In a specific embodiment, the copper phthalocyanine pigment of the present invention has a narrow particle size distribution with 90% of particles between about 0.01 μm and about 0.10 μm, an overall average particle size of no more than about 0.05 μm, a D99 of no more than about 0.3 μm, and a polydispersity of about 2.0 or less. The term "D99" used herein refers to the size to which particles of 99 wt % of the tested samples is smaller than or equal. The term, "polydispersity" used herein refers to a ratio of the weight/volume average size (Dw) to the number average size (Dn), that is, Dw/Dn and indicates the distribution of individual particle size in a batch of pigment. The copper phthalocyanine pigment of the present invention may or may not contain chlorine atoms. Typically, the copper phthalocyanine pigment containing 0-4 chlorine atoms is most preferable, but those containing more than 4 chlorine atoms may be also used. The present invention further provides a pigment composition comprising the pigment of the present invention and a water-based polymeric dispersing resin. In addition, the present invention provides a process for producing the pigment and the composition of the present invention. Furthermore, ink compositions containing the pigments or pigment compositions of the invention as well as coatings, such as paint coatings, comprising the pigments or pigment compositions of the invention, are also provided.

DETAILED DESCRIPTION OF THE INVENTION

Figure 1:
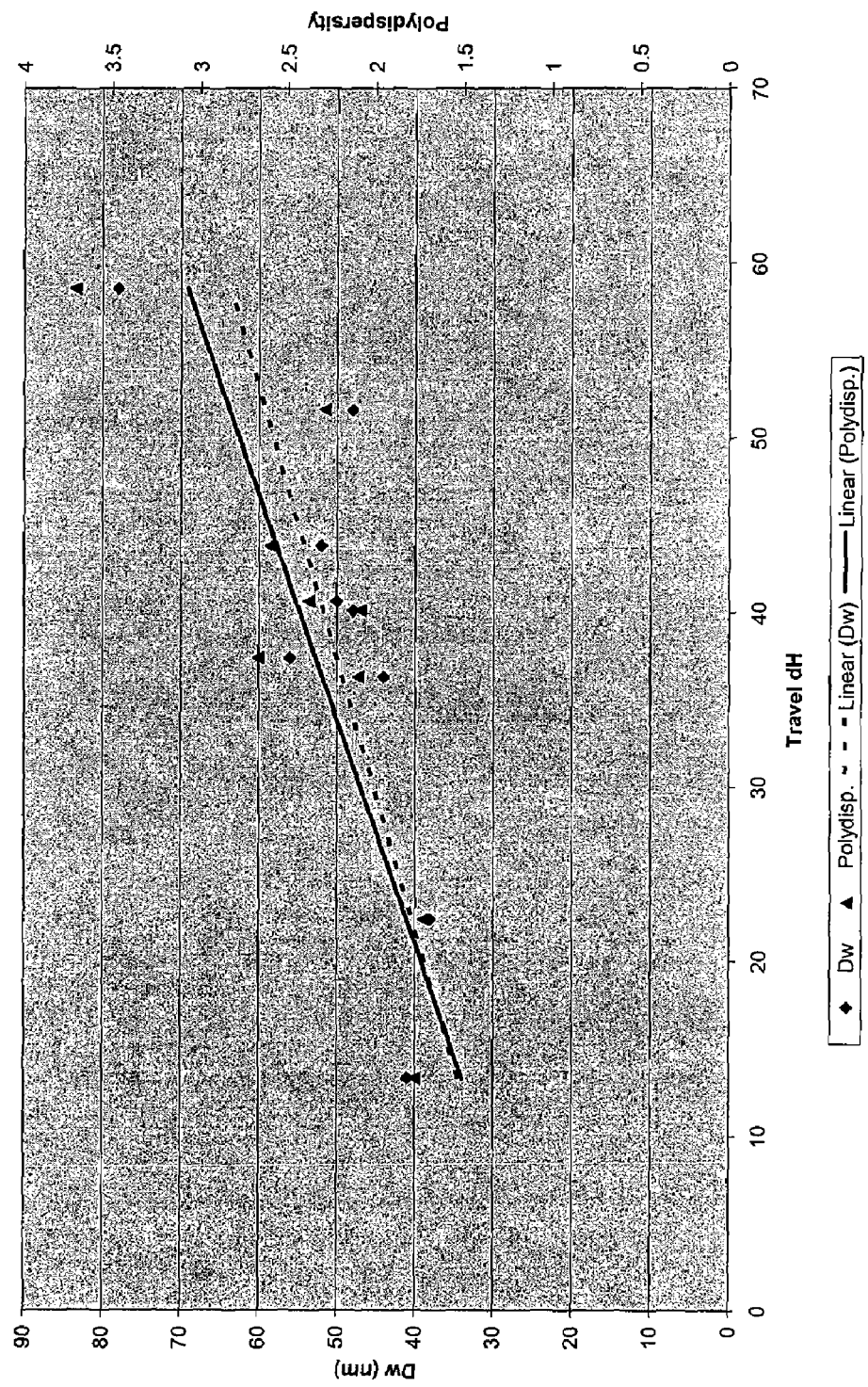
FIG. 1 is a graph showing the correlations among Dw, polydispersity and Travel dH.

The present invention generally relates to water-dispersible phthalocyanine pigments, in particular, metallophthalocyanine pigments having a narrow particle-size distribution as reflected by a specific polydispersity value. The metal of the metallophthalocyanine may be any metals that are commonly used to form metallophthalocyanine, including, but not limited to, copper, iron, zinc, cobalt, platinum, chromium, nickel, palladium, and so forth. The most preferred phthalocyanine pigments are chlorinated copper phthalocyanine pigments, but any other phthalocyanine pigments or metallophthalocyanine pigments, unsubstituted or substituted with, for example, halogens, $C_1$-$C_6$ alkyl, $C_1$-$C_6$ alkoxy, or other substituents typical of phthalocyanine pigments, are also encompassed by the present invention so long as the pigments have the same size-characteristics as described below.

The present invention is based on the discovery by the present inventors that a copper phthalocyanine pigment optionally containing chlorine atoms, having a particle-size distribution with 90% of particles between about 0.01 µm and about 0.10 µm, an overall average particle size of no more than about 0.05 µm, a D99 of no more than about 0.3 µm, and a polydispersity of about 2.0 or less, exhibits a better down travel than the currently available commercial products. The pigments and the compositions containing the same are compatible with waterborne coating systems and useful in the automotive industry. The pigments and the composition of the present invention can be also used for preparing ink compositions.

Crude copper phthalocyanine to be used for preparing the pigment of the present invention can be obtained by any method known to one skilled in the art. For example, chlorinated copper phthalocyanine blue crude can be obtained by a reaction of suitable amount of 4-chlorophthalic acid, phthalic anhydride or a derivative thereof, urea and a copper source, such as cuprous chloride, or by a reaction of 4-chlorophthalic acid, phthalonitrile or a derivative thereof and a copper source in an organic solvent, in the presence or absence of a catalyst, such as ammonium molybdate or titanium tetrachloride. Alternatively, previously prepared copper phthalocyanine may be chlorinated in a molten chlorine salt, such as aluminum chloride/titanium tetrachloride melt and preferably an aluminum chloride/sodium chloride melt, or in chlorosulfonic acid. Although the resultant chlorinated copper phthalocyanine blue crude can be conditioned by any method commonly used for conditioning phthalocyanines as long as it results in the desired parameters set forth above, the method described below is most preferable.

The crude pigment is first dry milled to a subpigmentary particle size. The dry milling step can be carried out using procedures known in the art, such as ball milling. To avoid undesirable crystal growth that can produce particles outside the desired size range of about 0.01 to about 0.5 µm, dry milling is preferably carried out at temperatures below about 80° C. and preferably at about 400 to 50° C. Milling must be carried out for a sufficient length of time to allow the particles to reach the desired size range (as determined, for example, by X-ray analysis), but the length of time is not otherwise critical. In general, a period of from about 6 hours up to about 24 hours is sufficient, with the preferred time generally depending on the capacity of the mill used. For example, milling with a laboratory mill might take 2 or 3 days, whereas milling with a plant-scale mill might take only 8 to 12 hours.

The milled pigment is then conditioned by mixing (for example, by stirring) with a conditioning solvent mixture comprising water and an aromatic carboxylic acid ester, optionally in the presence of a dispersant. The water and ester can be combined with the milled pigment separately or premixed. Although the exact amount of the solvent mixture used during the finishing process is generally not critical, stirrable slurries typically contain at least about 2 parts by weight of water and about 0.2 part by weight of the ester for each part of the crude pigment. In general, about 3 to about 6 parts by weight, preferably 4 to 5 parts by weight, of water and about 0.4 to about 1.2 parts by weight, preferably 0.6 to 0.8 parts by weight, of the ester for each part of crude pigment, has been found particularly advantageous to use. Larger quantities of solvent, although effective, are unnecessary and may even be undesirable for economic and environmental reasons.

The esters in the conditioning solvent mixture are preferably $C_1$-$C_{12}$ alkyl esters of $C_6$-$C_{12}$ monocarboxylic and/or dicarboxylic acids. Suitable aromatic monocarboxylic acids include, but not the way of limitation, benzoic acid and naphthoic acids and isomeric forms thereof, as well as aromatic ring-substituted derivatives in which the substituent can be, for example, alkyl, alkoxy, alkanoyl, halogen, hydroxy, amino, nitro, vinyl, and allyl groups. Suitable aromatic dicarboxylic acids include phthalic, isophthalic, terephthalic, and naphthalic acids and the isomeric forms thereof, as well as aromatic ring-substituted derivatives. Suitable $C_1$-$C_{12}$ alkyl groups include methyl, ethyl, propyl, butyl, pentyl, hexyl, heptyl, octyl, nonyl, decyl, undecyl, and dodecyl, and isomeric forms thereof. Esters of dicarboxylic acids can contain two different alkyl groups, although esters having identical alkyl groups are preferred. Preferred organic solvents include $C_1$-$C_4$ alkyl esters of benzoic, phthalic, and salicylic acids, particularly methyl benzoate, methyl salicylate, and dimethyl phthalate. Mixtures of such esters are also suitable. Esters of aromatic tricarboxylic and tetracarboxylic acids can be used but are less preferred.

The conditioning solvent mixture may optionally contain a dispersant. Suitable dispersants include homopolymers or copolymers of ethylenically unsaturated monomers, such as (meth)acrylic acids or corresponding alkyl or hydroxyalkyl esters, polyester, polyurethane, styrene-maleic anhydride copolymers (e.g., SMAR® Resins), various forms of rosin or polymerized rosin, alkali metal salts of sulfosuccinate esters, alkylene oxide polymers or copolymers, and so forth.

The conditioning step can be carried out at temperatures in the range of, for example, from about 30° C. to about 145° C. In general, however, temperatures below about 70° C. are less preferred because of a tendency to give less readily dispersed pigment. Furthermore, although temperatures above about 90° C. can be used, they are less preferred because of potential overgrowth of crystals. Conditioning must be carried out for a sufficient length of time to allow the particles to attain optimum pigmentary size and distribution. Conditioning times typically range from at least about 4 hours, preferably at least 8 hours, to about 12 hours, but the length of time is not otherwise critical.

Isolation of the conditioned pigment can be carried out by any of several methods known in the art. Although it is possible in theory to remove the solvent by physical separation methods, it has been found advantageous to hydrolyze the esters of aromatic carboxylic acids and their by-products removed before the pigment is collected. Hydrolysis of such esters can be carried out, for example, by heating the solvent-containing conditioned pigment with a strongly alkaline solution, preferably an aqueous solution, such as aqueous sodium or potassium hydroxide. A particularly preferred hydrolysis method involves heating the solvent-containing pigment for about 2 hours at about 85° C. in about 4 to about 10% aqueous sodium hydroxide prepared, for example, by adding 50% aqueous sodium hydroxide directly to the aqueous conditioning mixture. Other hydrolysis methods known in the art may be also suitable. The carboxylate and alcohol by-products formed during hydrolysis can then be removed (and recovered if desired), for example, during the separation step.

The pigment can be collected by methods known in the art, preferably filtration, and then dried. Other collection methods known in the art, such as centrifugation, may be also suitable, but are generally less preferred. When the pigment is collected by filtration, the hydrolysis by-products can be easily removed by washing the pigment filter cake, preferably, with water. The pigment is then dried for finishing.

The resulting dried pigment is ground within a high-shear mixer containing about 1 to about 10 parts by weight, preferably about 4 to 6 parts by weight, of an inorganic salt per part of organic pigment and about 1 to about 5 parts by weight, preferably about 1 to 2 parts by weight, of a liquid in which the organic pigment and salt are substantially insoluble.

Suitable salts for salt grinding include sodium chloride, potassium chloride, calcium chloride, zinc chloride, aluminum chloride, sodium sulfate, aluminum sulfate, calcium carbonate, sodium acetate, calcium acetate, sodium citrate, potassium sodium tartrate, and so forth. Sodium chloride is particularly convenient and preferred.

Suitable liquids for use in salt grinding are liquids, preferably organic liquids or low-melting solids that liquefy during grinding, in which the organic pigment and salt are substantially insoluble but which enable the physical transformation of crude pigments into finished pigments to occur when carrying out the process of the present invention. Examples of suitable organic liquids include alcohols, such as methanol, ethanol, propanol, isopropanol, ethylene glycol, propylene glycol, or glycerin; lower organic acids, such as formic or acetic acid; ethers such as dioxane, tetrahydrofuran, ethylene glycol monoethyl or diethyl ether, or oligo- and polyglycol ethers; ketones, such as acetone or methyl ethyl ketone; aromatics, such as toluene, xylene, chlorobenzene, nitrobenzene, or chloronaphthalene; esters, such as methyl benzoate, dimethyl phthalate, or methyl salicylate; and amides, such as formamide, dimethylformamide, or N-methyl-pyrrolidone. Preferred organic liquids are glycols, particularly ethylene glycol and propylene glycol. It is possible, though generally less preferred, to include small amounts of water that should not exceed 50% of the total amount of liquid, including the amount of water that may be present in the crude pigment. Although virtually any high-shear mixer can be used, continuous sigma blade high-shear mixers are preferred.

The initial grinding step (a) is carried out at a temperature of about 0° C. to about 100° C., preferably 30° C. to 60° C., for a period sufficient to produce a uniform paste; for example, for at least one hour but no more than 24 hours, preferably for about two to ten hours, and most preferably for about 5 hours. Although, on one hand, it is possible to use a relatively large amount of the liquid, which will usually produce a thin pigment mass, it is generally necessary to use only a small amount of liquid that will produce a relatively thick pigment mass. If, on the other hand, the pigment mass becomes too thick during the grinding step, either due to the evaporation of the liquid or the formation of finer pigment particles, it may be desirable to add small amounts of the liquid to maintain effective and efficient grinding.

In step (b), the pigment paste from step (a) is mixed with water, which may optionally contain or be treated with an acid and/or various organic liquids, which are preferably water-miscible organic liquids.

Acids that are capable of forming soluble metal salts can be added during step (b) to help remove metal or metal oxide contaminants from the pigment mass. Suitable acids include mineral acids, such as hydrochloric acid and sulfuric acid, and at least moderately acidic organic acids, such as acetic acid, trifluoroacetic acid, and citric acid.

Although it is generally preferable to use only water in step (b), it is also possible to include certain organic liquids. Suitable organic liquids for use in step (b) include, but not limited to, lower aliphatic alcohols, such as methanol, ethanol, propanol, isopropanol, ethylene glycol, propylene glycol, or glycerin; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and so forth that are known in the art. Other organic liquids may be used but are generally much less preferred. If a low volatile water-immiscible organic liquid is used at any step in the process of the invention, it may be necessary to wash the pigment in two steps: first, with water to remove salts and other water-soluble materials and second, with a more volatile organic solvent to remove the remaining organic materials.

The water or organic liquids in step (b) may optionally contain a dispersant, for example, those described above.

Step (b) is carried out by stirring the pigment mixture, for a period sufficient to dissolve the inorganic salt, essentially at any temperature at which the mixture does not freeze or boil; for example, at a temperature range of about 0° C. to about 100° C. for aqueous mixtures. However, temperatures near the boiling point of the mixture, i.e., typically about 90° C. to about 95° C. are generally preferred. When the mixture contains an organic solvent, the temperature varies depending on the solvent.

The finished pigment thus obtained is collected in step (c) by methods known in the art, preferably by filtration followed by washing to remove residual acid. Other collection methods known in the art, such as membrane filtration, centrifugation, or even simple decantation, are also suitable but generally less preferred. The resulting pigment may be dried for use, but is most preferably reslurried for further conditioning. Drying may be carried out using conventional drying methods, such as spray drying, tray drying, drum drying, and so forth; however, spray drying is most preferable.

The pigment may be reslurried in water, water-miscible solvent, or mixture thereof, for further conditioning prior to spray drying. If reslurried in water only, the slurry can be spray-dried directly or heated to temperatures between about 25° C. and about 95° C., preferably between about 25° C. and about 70° C., before spray-drying. If reslurried in water-miscible solvent or mixture of water and water-miscible solvent, the slurry is conditioned at a temperature of about 25° C. to about 150° C., preferably about 90° C. to about 120° C. If the conditioning is above the boiling point of the solvent mixture, this step is carried out under pressure. In general, a conditioning time of from about 30 minutes to about ten hours is sufficient, with preferred times being about 2-6 hours. Suitable water-miscible solvents may include alcohols, such as methanol, ethanol, propanol, isopropanol, ethylene glycol, propylene glycol, or glycerin; or ketones, such as acetone, methyl ethyl ketone, diacetone alcohol, methyl isopropyl ketone, methyl amyl ketone, methyl n-butyl ketone, or N-methyl-pyrrolidone, and so forth. The pigment slurry should contain about 5% to 75%, preferably about 15% to 50%, and most preferably about 25% to 35% of active resin dispersant based on the pigment weight. Suitable resin dispersants include, but not limited to, ethylenically unsaturated monomers, homopolymers or copolymers of (meth)acrylic acids or corresponding alkyl or hydroxyalkyl esters, polyester, polyurethane, styrene-maleic anhydride copolymers (e.g., SMAR® Resins, by Sartomer Company Inc., PA), various forms of rosin or polymerized rosin, alkali metal salts of sulfosuccinate esters, alkylene oxide polymers or copolymers, and so forth.

Also suitable are commercially available active polymeric dispersants, such as SOLSPERSE® 27000 (Noveon Inc., OH), DISPERBYK®-190 (BYK Chemie, Germany), and Borchi® Gen SN 95 (Borchers GmbH, Germany), preferred of which is SOLSPERSE® 27000, CAS NO. 35545-57-4, a polymer of the formula:

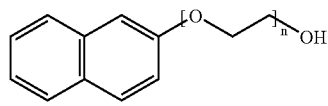

wherein n is a number such that the average molecular weight is in the range of about 1000-1100.

EXAMPLES

The following examples illustrate the chlorinated copper phthalocyanine pigment and composition thereof provided by the present invention. These examples should not be construed as limiting.

The pigments produced in the examples below were evaluated for their Travel dH in an automotive waterborne basecoat/solventborne clearcoat system as follows: The pigments were dispersed into the waterborne basecoat at a pigment loading of 16.4% after pH adjustment to 8.0±0.15 using a Skandex paint conditioner for 6 hours. This dispersion stage included a solubilized acrylic resin, propylene glycol monomethyl ether, and a polypropylene glycol resin. The mixture is then reduced to 14% with distilled water and an acrylic latex solution. The dispersion is incorporated into waterborne paints with a ratio of 1:1 color:$TiO_2$ and 1:1 color:Aluminum. The paints are sprayed onto a coilcoat-primed aluminum panel at a film thickness of 25±5 microns, baked at 200° F., and then a solventborne acrylic clearcoat is sprayed over the basecoat at a film thickness of 50±5 microns and baked at 260° F. The sprayed aluminum paint panels are evaluated on an X-Rite MA-58 multi-angle spectrophotometer to give a 5-angle representation of the color performance versus the standard.

As a reference, commercially available chlorinated copper phthalocyanine pigment, 428-4816 (Sun Chemical Corporation, OH), was used.

The particle sizes of each pigment preparation were determined by a disk centrifuge particle size (DCP) analyzer (Brookhaven Instrument Corporation, NY).

Comparative Example 1

Chlorinated copper phthalocyanine blue crude was charged to a ball mill to realize a ratio of 1 to 10 parts pigment to balls. The crude pigment was then milled for 12-24 hours at no more than 70° C. Fifty (50) grams of the resulting crude were then slurried in 15% methyl benzoate/water at 15-17% solids. The slurry was then conditioned at 85° C. for 8 hours. The methyl benzoate was hydrolyzed with excess sodium hydroxide to remove the methyl benzoate. The product was isolated as presscake. Fifty (50) grams dry weight of the presscake were then slurried in water at 20.0% total solids with a high shear mixer. The slurry was spray dried. The down travel, particle size, and polydispersity are shown in Table 1.

Comparative Example 2

Chlorinated copper phthalocyanine blue crude was charged to a ball mill to realize a ratio of 1 to 10 parts pigment to balls. The crude pigment is then milled for 12-24 hours at no more than 70° C. Fifty (50) grams of the resulting crude were then slurried in 15% methyl benzoate/water at 15-17% solids. The slurry was then conditioned at 85° C. for 8 hours. The methyl benzoate was hydrolyzed with excess sodium hydroxide to remove the methyl benzoate. The product was isolated as presscake. Fifty (50) grams dry weight of the presscake were then slurried in water with 25.0% active Solsperse® 27000 resin based on pigment weight at 19% total solids with a high shear mixer. The slurry was spray dried. The down travel, particle size, and polydispersity are shown in Table 1.

Comparative Example 3

Chlorinated copper phthalocyanine blue crude was charged to a ball mill to realize a ratio of 1 to 10 parts pigment to balls. The crude pigment was then milled for 12-24 hours at no more than 70° C. Fifty (50) grams of the resulting crude were then slurried in 15% methyl benzoate/water at 15-17% solids. The slurry was then conditioned at 85° C. for 8 hours. The methyl benzoate was hydrolyzed with excess sodium hydroxide to remove the methyl benzoate. The product was isolated as presscake. Fifty (50) grams dry weight of the presscake were then slurried in methanol at 15% solids with a high shear mixer and conditioned at 120° C. for three hours. The slurry was cooled to 60° C. and drowned into 300 g water. The methanol was distilled off and the resultant slurry was spray dried. The down travel, particle size, and polydispersity are shown in Table 1.

Comparative Example 4

Chlorinated copper phthalocyanine blue crude was charged to a ball mill to realize a ratio of 1 to 10 parts pigment to balls. The crude pigment was then milled for 12-24 hours at no more than 70° C. Fifty (50) grams of the resulting crude were then slurried in 15% methyl benzoate/water at 15-17% solids. The slurry was then conditioned at 85° C. for 8 hours. The methyl benzoate was hydrolyzed with excess sodium hydroxide to remove the methyl benzoate. The product was isolated as presscake. Fifty (50) grams dry weight of the presscake were then slurried in methanol with 30.0% active Solsperse 27000 resin based on pigment weight at 19% solids with a high shear mixer and conditioned at 120° C. for three hours. The slurry was cooled to 60° C. and drowned into 300 g water. The methanol was distilled off and the resultant slurry was spray dried. The down travel, particle size, and polydispersity are shown in Table 1.

Comparative Example 5

Chlorinated copper phthalocyanine blue crude was charged to a ball mill to realize a ratio of 1 to 10 parts pigment to balls. The crude pigment was then milled for 12-24 hours at no more than 70° C. Fifty (50) grams of the resulting crude were then slurried in 15% methyl benzoate/water at 15-17% solids. The slurry was then conditioned at 85° C. for 8 hours. The methyl benzoate was hydrolyzed with excess sodium hydroxide to remove the methyl benzoate. The product was isolated as presscake and dried. Thirty-two (32) grams of product were charged to a sigma blade mixer/kneader along with 243 g of salt and 60 g of propylene glycol and ground for five hours. The paste was discharged from the mixer/kneader into 800 g of water. The pH is adjusted to 2.0-2.5 with concentrated HCl, heated to 90° C. for one hour and isolated. The presscake was reslurried in 600 g of water and spray dried. The down travel, particle size, and polydispersity are described in Table 1.

Example 1

Chlorinated copper phthalocyanine blue crude was charged to a ball mill to realize a ratio of 1 to 10 parts pigment to balls. The crude pigment was then milled for 12-24 hours at no more than 70° C. The 50 grams of the resulting crude were then slurried in 15% methyl benzoate/water at 15-17% solids. Subsequently, the slurry was conditioned at 85° C. for 8 hours. The methyl benzoate was hydrolyzed with excess sodium hydroxide to remove the methyl benzoate. The thus-prepared product was isolated as presscake and dried. Thirty-two (32) grams of the product were charged to an attritor along with 243 g of salt and 60 g of propylene glycol and ground for five hours. The resulting paste was discharged from the attritor into 800 g of water and the pH was adjusted to 2.0-2.5 with concentrated HCl. The presscake was isolated after being heated to 90° C. for one hour in the water. The presscake was reslurried in 300 g of water with 30.0% active SOLSPERSE 27000 resin, based on the weight of the pigment, and spray dried. The down travel, particle size, and polydispersity of the resultant pigment composition are shown in Table 1.

Comparative Example 6

Chlorinated copper phthalocyanine blue crude was charged to a ball mill to realize a ratio of 1 to 10 parts pigment to balls. The crude pigment was then milled for 12-24 hours at no more than 70° C. Fifty (50) grams of the resulting crude were then slurried in 15% methyl benzoate/water at 15-17% solids. The slurry was then conditioned at 85° C. for 8 hours. The methyl benzoate was hydrolyzed with excess sodium hydroxide to remove the methyl benzoate. The product was isolated as presscake and dried. Thirty-two (32) grams of product were charged to an attritor along with 243 g of salt and 60 g of propylene glycol and ground for five hours. The paste was discharged from the attritor into 800 g of water. The pH was adjusted to 2.0-2.5 with concentrated HCl, and the presscake was heated to 90° C. for one hour and isolated. The presscake was reslurried in 200 g of methanol and conditioned at 120° C. for three hours. Three-hundred (300) ml of water were added and the methanol was distilled off prior to spray-drying. The down travel, particle size, and polydispersity are shown in Table 1.

Example 2

Chlorinated copper phthalocyanine blue crude was charged to a ball mill to realize a ratio of 1 to 10 parts pigment to balls. The crude pigment was then milled for 12-24 hours at no more than 70° C. The 50 grams of the resulting crude were then slurried in 15% methyl benzoate/water at 15-17% solids. The slurry was then conditioned at 85° C. for 8 hours. The methyl benzoate was hydrolyzed with excess sodium hydroxide to remove the methyl benzoate. The product was isolated as presscake and dried. Thirty-two (32) grams of the product was charged to a sigma blade mixer/kneader along with 243 g of salt and 60 g of propylene glycol and ground for five hours. The paste was discharged from the mixer/kneader into 800 g of water and the pH was adjusted to 2.0-2.5 with concentrated HCl. The presscake was isolated after being heated to 90° C. for one hour. The presscake was reslurried in 200 g of methanol with 30.0% active SOLSPERSE 27000 resin, based on the weight of the pigment, and conditioned at 120° C. for three hours. Two-hundred (200) ml of water were added and the methanol was distilled off prior to spray drying. The down travel, particle size, and polydispersity of the resulting pigment composition are shown in Table 1.

TABLE 1

| Example | Travel dH | Dw nm | D1 nm | D5 nm | D95 nm | D99 nm | Polydispersity |
|---|---|---|---|---|---|---|---|
| 428-4816 | 43.8 | 52 | 13 | 15 | 171 | 476 | 2.6 |
| Comparative Example 1 | 58.5 | 78 | 14 | 15 | 394 | 673 | 3.71 |
| Comparative Example 2 | 51.6 | 48 | 14 | 16 | 138 | 449 | 2.29 |
| Comparative Example 3 | 40.6 | 50 | 14 | 16 | 139 | 442 | 2.38 |
| Comparative Example 4 | 37.4 | 56 | 14 | 16 | 209 | 512 | 2.67 |
| Comparative Example 5 | 36.3 | 44 | 14 | 16 | 109 | 382 | 2.1 |
| Example 1 | 22.4 | 38 | 15 | 16 | 93 | 263 | 1.73 |
| Comparative Example 6 | 40.1 | 48 | 15 | 17 | 115 | 397 | 2.09 |
| Example 2 | 13.3 | 41 | 15 | 17 | 87 | 248 | 1.78 |
| Slope | | 0.64 | −0.03 | −0.03 | 4.86 | 8.37 | 0.035 |
| Intercept | | 25.96 | 15.35 | 17.24 | −23.95 | 106.96 | 1.053 |
| $R^2$ | | 0.572 | 0.369 | 0.397 | 0.489 | 0.795 | 0.629 |
| Correlation | | 0.756 | −0.607 | −0.630 | 0.699 | 0.892 | 0.793 |

Figure 2:
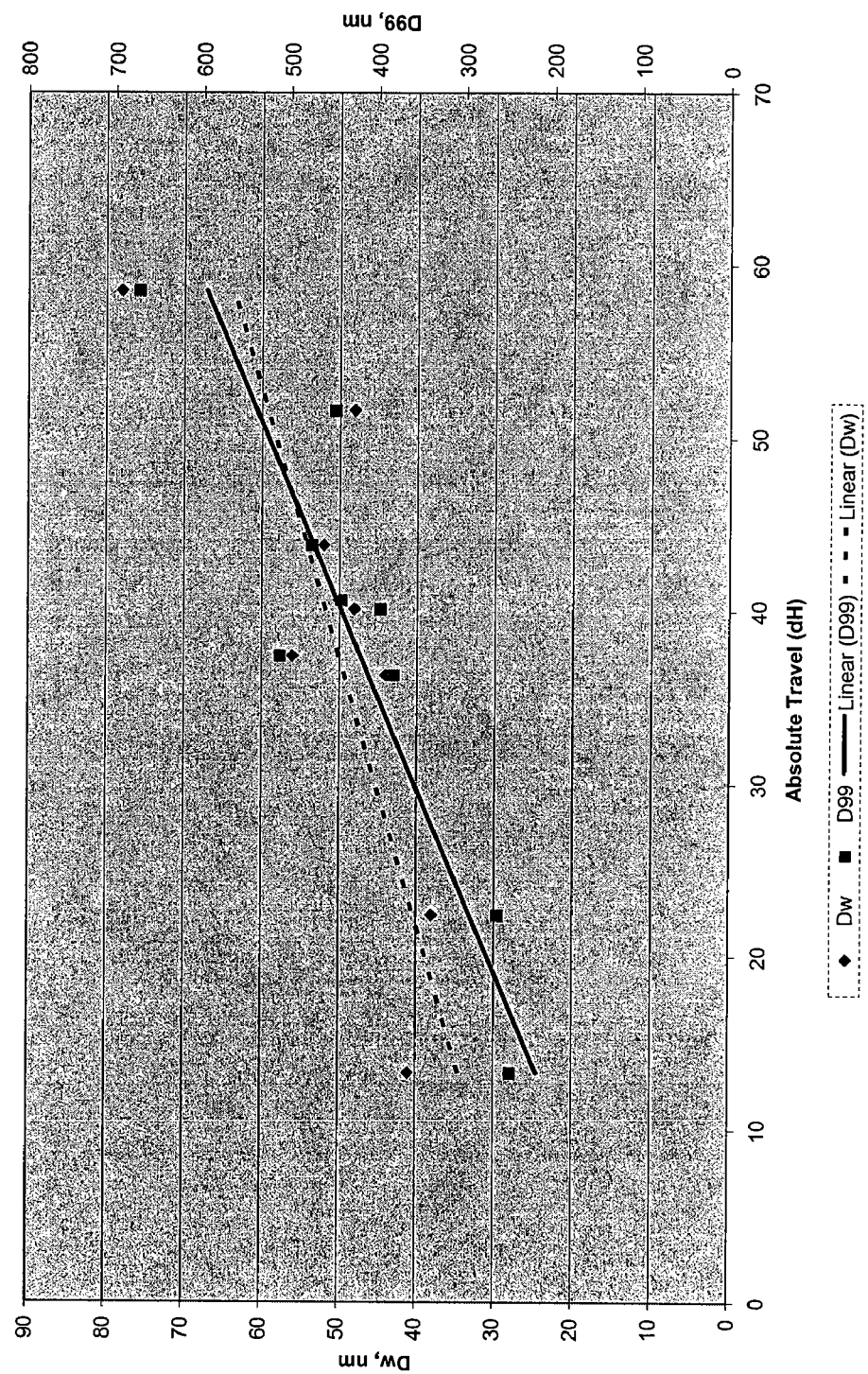
FIG. 2 is a graph showing the correlations among D99, polydispersity and Travel dH.

The correlation between Dw or polydispersity and Travel dH is shown in FIG. 1 and that between D99 or polydispersity and Travel dH is shown in FIG. 2.

EQUIVALENTS

Those skilled in the art will recognize, or be able to ascertain many equivalents to the specific embodiments of the invention described herein using no more than routine experimentation. Such equivalents are intended to be encompassed by the following claims.

All publications and patents mentioned in this specification are herein incorporated by reference into this specification.

What is claimed is:

1. A pigment composition, comprising phthalocyanine pigment having a particle-size distribution with 90% of particles between about 0.01 and about 0.10 μm, an overall average particle size of no more than about 0.05 μm, a D99 of no more than about 0.3 μm, and a polydispersity of about 2.0 or less; and a carrier therefor.

2. The pigment composition of claim 1, wherein the phthalocyanine pigment is a metallophthalocyanine.

3. The pigment composition of claim 2, wherein the metal of the metallophthalocyanine is selected from the group consisting of copper, iron, zinc, cobalt, platinum, chromium, nickel and palladium.

4. The pigment composition of claim 3, wherein the phthalocyanine pigment is a chlorinated copper phthalocyanine.

5. The pigment composition of claim 4, wherein the chlorinated copper phthalocyanine contains up to 4 chlorine atoms.

6. The pigment composition of claim 5, wherein the carrier comprises a water-based dispersing resin.

7. The pigment composition of claim 6, wherein the water-based dispersing resin comprises a resin selected from the group consisting of ethylenically unsaturated monomers, homopolymers or copolymers of (meth)acrylic acids or corresponding alkyl or hydroxyalkyl esters, polyester, polyurethane, styrene-maleic anhydride copolymers, rosin or polymerized rosin, alkali metal salts of sulfosuccinate esters, and alkylene oxide polymers or copolymers.

8. The pigment composition of claim 6, wherein the water-based dispersing resin comprises an ethoxylated naphthalene having the following formula:

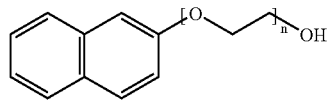

wherein n is a number such that the average molecular weight is in the range of about 1000-1100.

9. The pigment composition of claim 1, wherein the carrier comprises a water-based dispersing resin.

10. The pigment composition of claim 9, wherein the water-based dispersing resin comprises a resin selected from the group consisting of ethylenically unsaturated monomers, homopolymers or copolymers of (meth)acrylic acids or corresponding alkyl or hydroxyalkyl esters, polyester, polyurethane, styrene-maleic anhydride copolymers, rosin or polymerized rosin, alkali metal salts of sulfosuccinate esters, and alkylene oxide polymers or copolymers.

11. The pigment composition of claim 9, wherein the water-based dispersing resin comprises an ethoxylated naphthalene having the following formula:

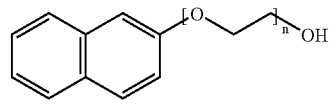

wherein n is a number such that the average molecular weight is in the range of about 1000-1100.

12. A method for preparing a phthalocyanine composition, comprising:
    (i) dry milling a crude phthalocyanine pigment to a subpigmetary particle size;
    (ii) mixing the pigment from step (i) with a conditioning solvent mixture;
    (iii) removing the solvent from the mixture from step (ii);
    (iv) drying the pigments from step (iii);
    (v) grinding the pigments from step (iv) with an inorganic salt and a liquid to form a pigment paste, wherein the pigments and the salt are substantially insoluble in the liquid;
    (vi) removing the salt from the pigment paste from step (v);
    (vii) reslurrying and conditioning the pigment paste from step (vi) with water, water-miscible solvent, or a mixture thereof, containing an aqueous water-based dispersing resin; and
    (viii) collecting and drying the pigment from step (vii).

13. The method of claim 12, wherein the conditioning solvent mixture in step (ii) comprises at least about 2 parts by weight of water and at least about 0.2 parts by weight of an aromatic carboxylic acid ester per part of the pigment.

14. The method of claim 13, wherein the conditioning solvent mixture in step (ii) comprises about 4 to about 5 parts by weight of water and about 0.6 to 0.8 parts by weight of the aromatic carboxylic acid ester per part of the pigment.

15. The method of claim 12, wherein step (ii) is conducted at the temperature between about 70° C. and about 90° C. for about 4 to about 12 hours.

16. The method of claim 12, wherein the inorganic salt in step (v) is selected from the group consisting of sodium chloride, potassium chloride, calcium chloride, zinc chloride, aluminum chloride, sodium sulfate, aluminum sulfate, calcium carbonate, sodium acetate, calcium acetate, sodium citrate, and potassium sodium tartrate.

17. The method of claim 12, wherein the liquid in step (v) is selected from the group consisting of alcohols, lower organic acids, ether, ketones, aromatics, esters and amide.

18. The method of claim 17, wherein the liquid in step (v) is selected from the group consisting of methanol, ethanol, propanol, isopropanol, ethylene glycol, propylene glycol, glycerin, formic acid, acetic acid, dioxane, tetrahydrofuran, ethylene glycol monoethyl ether, diethyl ether, oligo- and polyglycol ethers, acetone, methyl ethyl ketone, toluene, xylene, chlorobenzene, nitrobenzene, chloronaphthalene, methyl benzoate, dimethyl phthalate, methyl salicylate, formamide, dimethylformamide, and N-methyl-pyrrolidone.

19. The method of claim 12, wherein the grinding in step (v) is conducted at a temperature between about 0° C. and about 100° C.

20. The method of claim 19, wherein the grinding in step (v) is conducted at a temperature between about 30° C. and about 60° C.

21. The method of claim 12, wherein the salt in step (vi) is removed with water.

22. The method of claim 21, wherein the water contains an acid or a water-miscible organic liquid or both.

23. The method of claim 22, wherein the acid is selected from the group consisting of hydrochloric acid, sulfuric acid, acetic acid, trifluoroacetic acid and citric acid.

24. The method of claim 22, wherein the water-miscible organic liquid is selected from the group consisting of lower aliphatic alcohols, ketones, ketoalcohols, amides, ethers, alkylene glycols and triols.

25. The method of claim 24, wherein the water-miscible organic liquid is selected from the group consisting of methanol, ethanol, propanol, isopropanol, ethylene glycol, propylene glycol, glycerol, acetone, methyl ethyl ketone, diacetone alcohol, dimethylformamide, dimethylacetamide, tetrahydrofuran, and dioxane.

26. The method of claim 21, wherein step (vi) is conducted at a temperature between about 0° C. and 100° C.

27. The method of claim 26, wherein step (vi) is conducted at a temperature between about 90° C. and about 95° C.

28. The method of claim 12, wherein the water-miscible solvent in step (vii) is an alcohol or ketone.

29. The method of claim 28, wherein the alcohol is selected from the group consisting of methanol, ethanol, propanol, isopropanol, ethylene glycol, propylene glycol, and glycerin.

30. The method of claim 28, wherein the ketone is selected from the group consisting of acetone, methyl ethyl ketone, diacetone alcohol, methyl isopropyl ketone, methyl amyl ketone, methyl n-butyl ketone, and N-methyl-pyrrolidone.

31. The method of claim 12, wherein step (vii) is conducted at a temperature between about 25° C. and 150° C.

32. The method of claim 12, wherein an amount of the water-based dispersing resin in step (vii) is about 5% to about 75% based on the pigment weight.

33. The method of claim 32, wherein the amount of the water-based dispersing resin in step (vii) is about 25% to about 35% based on the pigment weight.

34. The method of claim 12, wherein the water-based dispersing resin in step (vii) comprises a resin selected from the group consisting of ethylenically unsaturated monomers, homopolymers or copolymers of (meth)acrylic acids or corresponding alkyl or hydroxyalkyl esters, polyester, polyurethane, and styrene-maleic anhydride copolymers, rosin or polymerized rosin, alkali metal salts of sulfosuccinate esters, and alkylene oxide polymers or copolymers.

35. The method of claim 12, wherein the water-based dispersing resin in step (vii) comprises an ethoxylated naphthalene having the following formula:

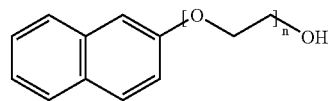

wherein n is a number such that the average molecular weight is in the range of about 1000-1100.

36. An ink composition containing a pigment in which the pigment comprises the pigment composition of claim 1.

37. A coating composition comprising a pigmented ink, wherein the pigmented ink comprises the pigment composition of claim 1.

38. The coating composition of claim 37, wherein the coating composition is a paint.

* * * * *